Sept. 29, 1964   B. S. FRASSETTO ETAL   3,150,571
ACTUATOR
Filed May 14, 1963   6 Sheets-Sheet 4

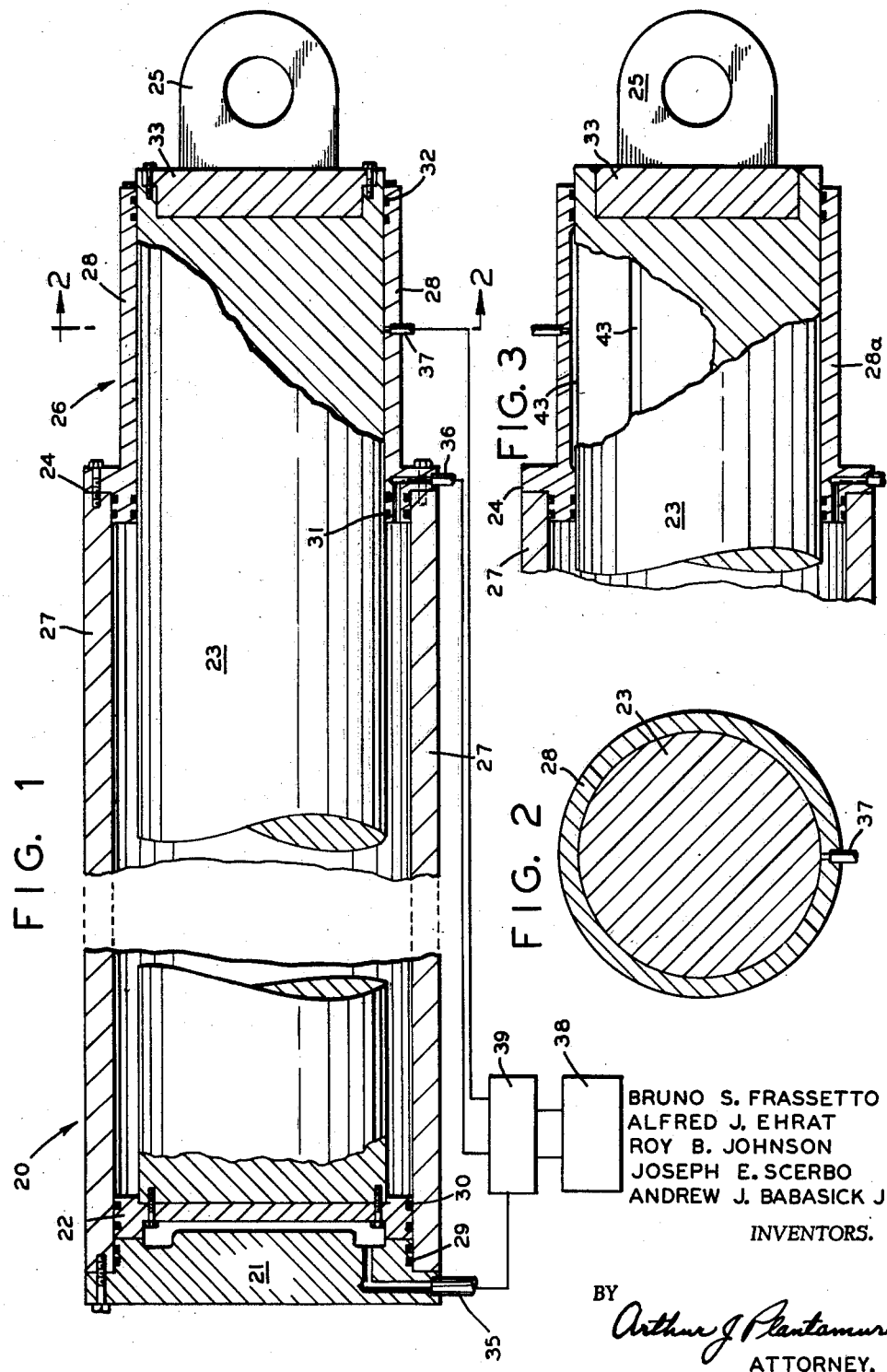

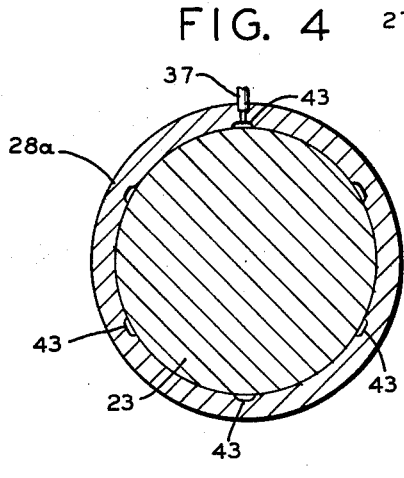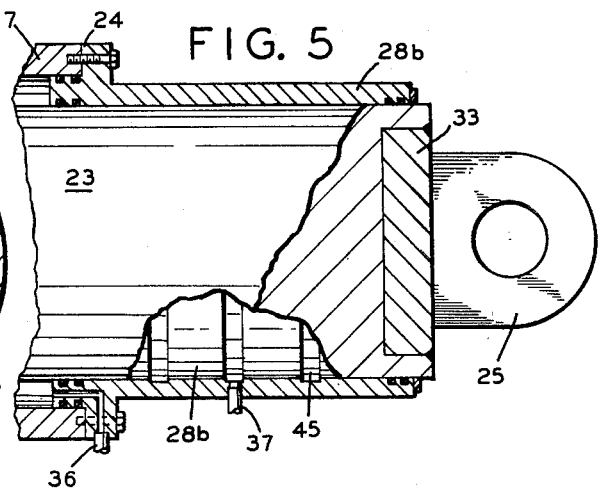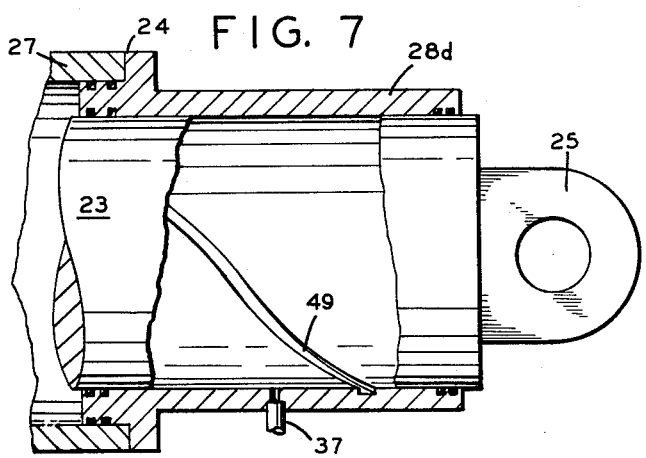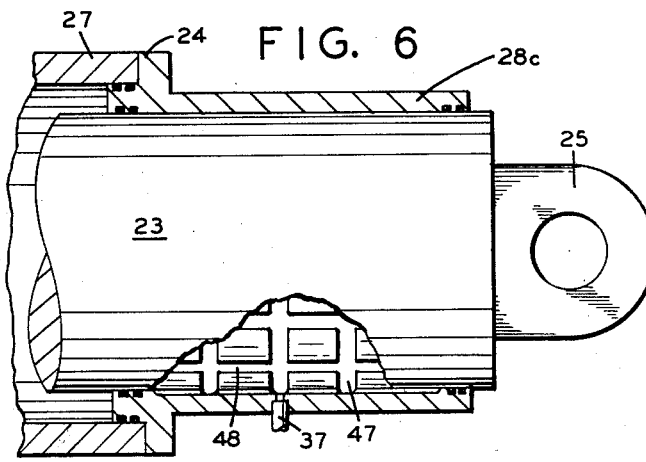

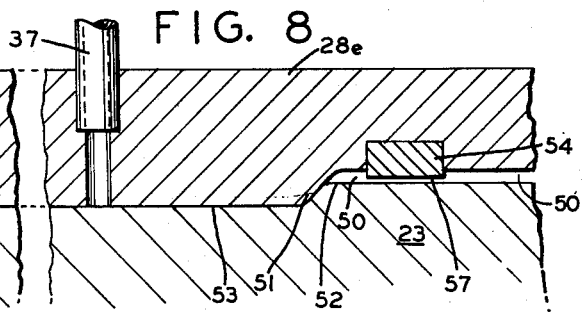

BRUNO S. FRASSETTO
ALFRED J. EHRAT
ROY B. JOHNSON
JOSEPH E. SCERBO
ANDREW J. BABASICK JR.

*INVENTORS.*

BY Arthur J. Plantamura
ATTORNEY.

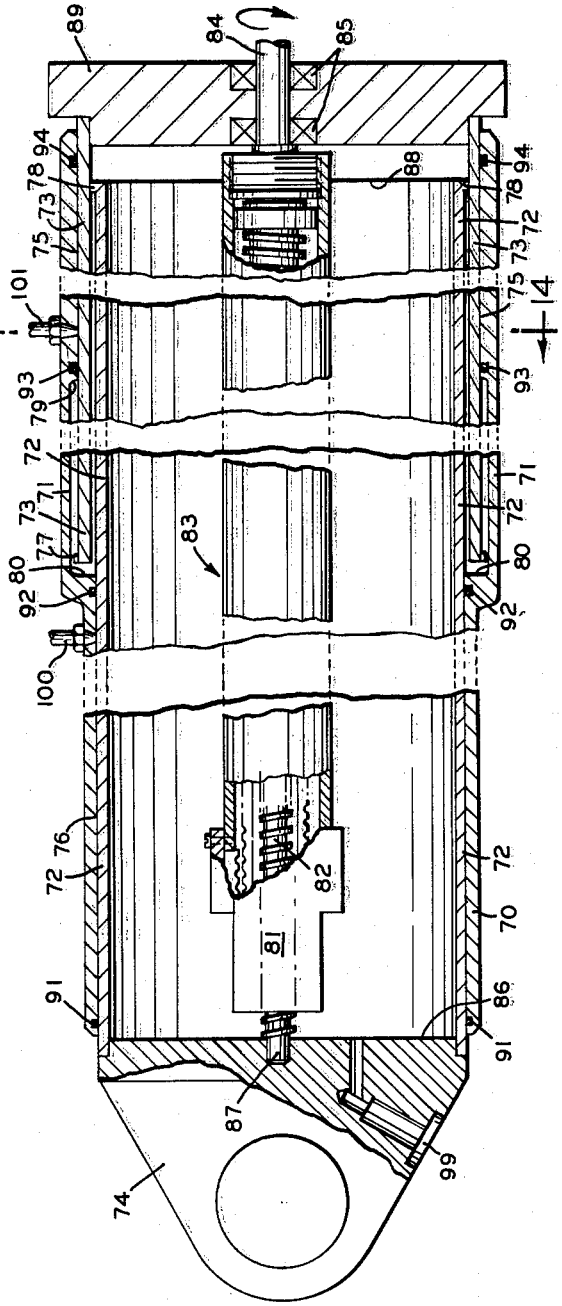
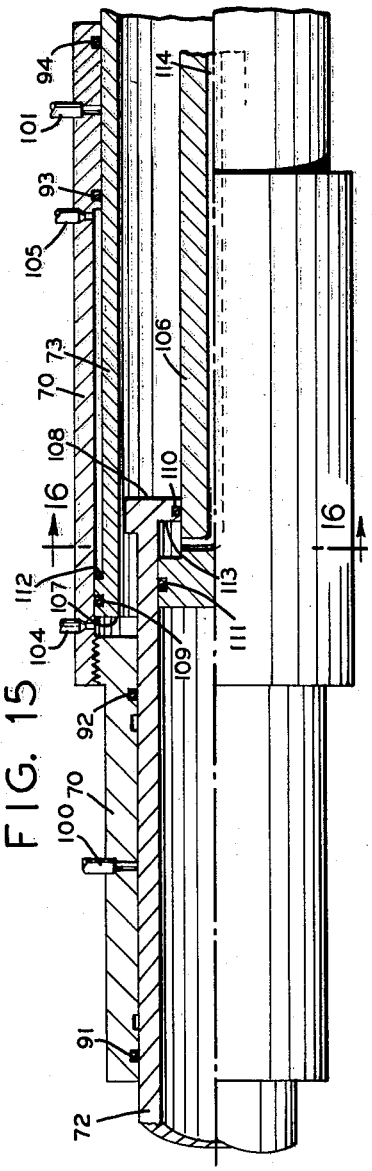
BRUNO S. FRASSETTO
ALFRED J. EHRAT
ROY B. JOHNSON
JOSEPH E. SCERBO
ANDREW J. BABASICK JR.
INVENTORS.
BY Arthur J. Plantamura
ATTORNEY.

Sept. 29, 1964  B. S. FRASSETTO ETAL  3,150,571
ACTUATOR

Filed May 14, 1963  6 Sheets-Sheet 6

BRUNO S. FRASSETTO
ALFRED J. EHRAT
ROY B. JOHNSON
JOSEPH E. SCERBO
ANDREW J. BABASICK JR.
*INVENTORS.*

BY Arthur J. Plantamura
ATTORNEY.

United States Patent Office 3,150,571
Patented Sept. 29, 1964

1

3,150,571
ACTUATOR
Bruno S. Frassetto, Westport, and Alfred J. Ehrat, Norwalk, Conn., Roy B. Johnson, Larchmont, N.Y., and Joseph E. Scerbo, Stamford, and Andrew J. Babasick, Jr., Trumbull, Conn., assignors to American Machine & Foundry Company, a corporation of New Jersey
Filed May 14, 1963, Ser. No. 280,355
13 Claims. (Cl. 92—28)

This invention relates to a mechanism providing releasable locking means between two members which are movable with respect to each other and more particularly to a device which functions both as a lock and as a bearing.

In a more specific and preferred embodiment, the invention is directed to actuator mechanisms wherein members capable of being translated with respect to each other are firmly interlocked in strong frictional engagement by an interference fit. The interlocked members are generally referred to as the inner member, also referred to as the piston assembly or arm, and the cylindrical outer member, also referred to as the peripheral sleeve or barrel, which is fitted over the inner member.

The invention essentially utilizes a mechanism wherein the interference fit which interlocks the members is relieved or separated at will by the introduction of a pressurized fluid at the interface between the members thereby allowing for relative radial separation of the members. In effect, when pressure is applied, this arrangement provides a fluid-static or fluid-dynamic bearing for low-friction movement. An important advantage of the mechanism of the invention resides in its fail-safe locking feature, i.e., when the pressure is relieved the arm and cylinder members interlock securely.

A specific arrangement may comprise a cylindrical rod, i.e., the piston within a cylinder or sleeve, the latter having an internal diameter, at least an annular segment of which is less than the outer diameter of the rod over which it is placed in engagement. Although the interlocked members are described as having circular cross-section because generally this geometry is most practical, it will be apparent that alternate cross-sectional configurations such as square, rectangular, hexagonal, octagonal, etc., may also be adapted. The sleeve is expandable radially when fluid pressure is applied. The expansion of the outer member or sleeve is held within the elastic limit of the material, and therefore does not introduce permanent deformation. The locking effect between the sleeve and rod is achieved by a combination of friction and molecular interaction of the materials in an interference fit relationship. It is the sum of the friction force plus the molecular attraction forces which provides the locking means.

The invention may be employed in such applications as actuators, jacks, brakes, force limiters, etc., and offers infinite position locking capability between the bearing members with a true fail-safe feature because loss of fluid pressure causes immediate and positive relative locking or gripping action between these members. This arrangement further provides an excellent means of achieving in actuators maximum moment continuity between translating and/or rotating parts and is an excellent means for achieving high stiffness effects between parts assembled in movable relationship.

It is a principal object of the invention to provide comparatively high force releasable locking means between relatively movable members. It is a more specific object of the invention to provide an actuator mechanism system which provides infinite locking position capability in the bearing surface between relatively translating and/or rotating members. It is another object of the invention to provide a bearing surface in which fluid pressure is employed to unlock the members and to afford a bearing surface and which comprises a fail-safe construction in that upon relief of pressure the members are positively interlocked. It is a further object of the invention to provide a novel means for assembly of interference fitting elements. Further objects of the invention include novel features of construction and assembly and a mechanism which offers economy in manufacture, longer life of components and facility for servicing or maintenance.

Additional objects of the invention will become apparent from the specification which follows when considered in connection with the various embodiments set forth in the drawing in which:

FIG. 1 is a side elevational view partially in section of an actuator system embodying the invention wherein the actuator is illustrated in conjunction with a schematic arrangement of a valve control means for fluid pressure to operate the mechanism.

FIG. 2 is an end view in section of the actuator taken along line 2—2 of FIG. 1.

FIG. 3 is a partial view in section of an actuator mechanism in accordance with the invention having a modified interlock bearing surface configuration.

FIG. 4 is an end view taken substantially along line 4—4 of FIG. 3.

FIG. 5 is a partial view in section of a mechanism in accordance with the invention showing a further modification of the bearing interlock.

FIG. 6 is a partial view in section illustrating another modification of the bearing interlock surface.

FIG. 7 is a partial view in section of still another modification of the bearing interlock surface.

FIG. 8 is an enlarged side elevational view in section of another modified embodiment employing the inventive concept in which fluid tight seals are omitted at the sides of the bearing.

FIG. 9 is a side elevational view partially in section of a further embodiment of the invention wherein the interference fit surface is formed on the outer periphery of the piston rather than on the inner wall of the cylinder and wherein fluid pressure is ported through the piston.

FIG. 10 is a schematic diagram of an actuator control valve system illustrating an arrangement which may be used to release the bearing-lock and to move the actuator rod.

FIG. 13 is a side elevational view partially in section of another modified embodiment of the invention and comprises a telescoping translating bearing actuator assembly.

FIG. 15 is a further alternate of a telescoping actuator arrangement constructed in accordance with the invention.

Figure 11:
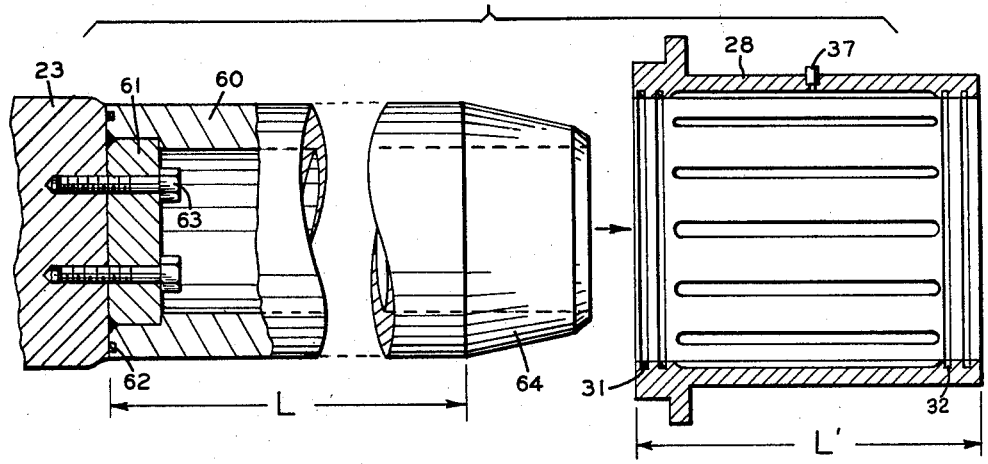
FIG. 11 is a sectional view of detached members of the bearing interlock illustrated for the purpose of facilitating a description of the method for assembing the components which comprise the bearing.

According to the invention, a sleeve member is placed over a central member which is constructed so as to be movable with respect to the sleeve member. The two members are machined or otherwise formed so that there is an interference fit at least in part at the interface between the two members. The extent of area of engagement or interlock and magnitude of the interference, which forms the bearing between the two members, may be varied depending on the locking force desired. It is possible to interlock the bearing surface between the members with such force that under sufficient stress, and in the absence of fluid pressure at the interface, molecular shearing will occur prior to piston rod movement.

The area of overlap between two members which contains the interlock bearing need not necessarily be confined in a sealed arrangement but preferably it is suitably sealed off as with O ring seals located at the ends of each section or segment which includes the interfering interfaces. The diametral clearance at the O ring or seal is within the limits for sealing requirements. The fit of that part of the surfaces between the O rings which comprises the interference fit is shrunk fit or otherwise engaged at assembly of the sections so that when the two members are engaged, the interference fit between the two members provides the resistance to a given axial load. The resistance depends on the amount of interference. When the bearing surface is locked, the load is taken directly through the rod and cylinder acting as a rigid column.

In order to unlock the sleeve from its inner member with which it is locked, the overlapping section between the O ring seals is pressurized pneumatically or by use of other fluid such as hydraulic liquid which is ported into the area and distributed at the bearing interface thereby effecting expansion of the sleeve. Suitable pressure may be supplied by a conventional pump, which may be a hand or foot lever operated, or mechanically and/or remotely actuated to feed or vent the pressurized fluid. The pressure build-up at the interface of the interference fit causes the inner section to expand until the interference tolerance between the members is overcome, i.e., the members are separated relative to the unpressurized state. The clearance or separation effected by the pressurization is still well within the confining capability allowable for the seals, and the cylinder is relatively free to be translated with respect to the inner member with which it engages in interference fit in the unpressurized condition. The fluid as it is forced in to separate the interface provides lubrication for the bearing surface. Because of the confined nature of the system a small volume of fluid is required to accomplish infinite locking and unlocking. In the case of hydraulic oil as little as one or two strokes of a hand or foot operated pump may provide sufficient pressure to unlock the bearing. Fluid as used herein contemplates compressible fluids, i.e., gases, and noncompressible fluids, i.e., liquids, such as water or hydraulic oil, and other medium such as gelatin-like solids or semi-solids.

A detailed description will be provided in conjunction with an actuator mechanism in the drawing. This arrangement, which locks the two members when there is no fluid under pressure fed at the interface, effects a bearing surface as the interface is pressurized, also when pressure is relieved, or fails, an interlock is effected in the bearing surface between the relative movable members. It will be apparent, however, that in addition to actuators, the invention may be applied to other apparatus in which a bearing and interlock capability between relatively movable elements is desirable.

Referring to the drawing, an actuator 20 in combination with valve control assembly to deliver fluid and provide venting in properly timed sequence, is illustrated. The actuator 20 comprises an outer cylindrical sleeve conveniently formed of two sections including the barrel 27 and the bearing portion 28 of the barrel suitably joined together at 24. Centrally positioned within sleeve 27 is a piston or actuator arm assembly which includes a piston rod member 23, a piston head 22 in conventional relationship at one end and a rod eye 25 at the other end. One end of the barrel 27 is shown closed off by end cap 21.

The bearing-lock section 26 which forms the bearing-lock assembly for the mechanism includes a locking bearing surface 28 constructed and arranged to provide an interference fit between the inner surface of the bearing part 28 of sleeve 27 and the outer periphery of inner member 23, i.e., the elements 23 and 28 are dimensioned so as to mechanically lock in the absence of pressurization at the interface to disengage the interference.

As shown, the bearing portion of the sleeve 28 is attached to barrel 27 and in a construction involving lengthy members, the connection of separate pieces in this manner may be dictated by practical considerations. However, it will be apparent that barrel or sleeve 27 and bearing portion of the sleeve 28 may be integrally formed and may be of uniform diameter where this is convenient, desirable or practical, an in such situations the joint at 24 is obviated. Static seals 29 are provided at each end of the barrel 27 to contain the pressurized fluid in a manner conventionally employed to move actuator rod member 23. Dynamic seals 30 and 31 prevent oil or other fluid employed to drive the piston from flowing across the piston.

In order to confine bearing release fluid within the bearing area, dynamic seals 31 and 32 are provided. It will be apparent however that the seals 31 and 32 are not absolutely indispensible and as illustrated in conjunction with FIG. 8 in lieu of such seals a bushing of conventional material and clearance at each side of the bearing interlock to form an orifice configuration to restrict fluid passage may be used.

A conventional pumping source and reservoir 38 and control valve arrangement 39 are provided to permit operation of the assembly. This arrangement comprises the usual means for extending and retracting piston 22 through pressurization introduced at 35 or 36 when the bearing is unlocked by suitable pressure applied through port 37. The actuator arm 23 may be moved in one direction by feeding fluid at 35 while venting at 36. This moves the piston member 22 to the right. For the reverse movement, pressurization at 36 while venting at 35 effects movement of member 22 to the left. Suitable control of pressurization and venting is effected through the conventional system illustrated at 38 and 39 in FIG. 1.

The actuator of the invention can be operated in an axial and/or rotary fashion using conventional means such as cams. Rotary motion can be in any discrete annular increment, for example, 45, 90 or 180 degrees. This rotary movement can occur simultaneously with or independent of the axial movement. The invention also contemplates first axial movement followed by a rotary movement or vice versa.

Reference is now made to the locking bearing 26. In the absence of pressure, the bearing is at rest in a mechanically locked position effected by an interference fit between the bearing surface 28 and the outer surface of rod 23. The quantum of force locking the members 28 and 23 at the bearing-lock interface is dependent on the extent of interference in the bearing fit. To unlock this mechanical coupling, fluid under pressure is introduced to the bearing interface through port 37 employing sufficient pressure to effect a relative separation between these surfaces but insufficient pressure to exceed the elastic limit of the sleeve expansion. This separation of the interface allows rod 23 to move freely through bearing assembly 26 when force is exerted on the piston 22 through the conventional system described in connection with pumping source and valve system 38 and 39.

The structure shown in FIG. 1 and as shown by particular reference to FIG. 2 comprises the sleeve 28 and piston 23 which are the elements of the interference fit. Fluid under pressure effectively expands the sleeve 28 while to a less perceptible extent compresses piston 23. Piston 23 as seen in cross-section is illustrated as being a solid rod, however, this internal member 23 may alternately be a hollow cylindrical member.

The interference fit bearing surface area shown in FIG. 1 and FIG. 2 is an uninterrupted surface or interface between the sleeve member 28 and interior member 23. The relative separation of these members to permit movement may be effected by suitable pressures which do not exceed the elastic limit of the members. In some applications a more rapid response time or higher locking capacity may be desirable. Accordingly, the interference may be provided with a plurality of configurations such as those illustrated in FIGS. 3 through 7. In the alternate bearing surface configurations of FIGS. 3 through 7 like members refer to similar parts and functions as those in FIG. 1.

As shown in FIG. 3 and FIG. 4 a plurality of axially disposed longitudinal runners or grooves 43 are formed. Although a plurality of grooves 43 are illustrated in sleeve 28a, suitable results also may be obtained with a single groove. The fluid port may optionally open into one of such grooves, as shown, or into the area intermediate a pair of these grooves if desired.

The alternate arrangement of FIG. 5 illustrates a plurality of annular ring-like grooves 45 in the sleeve 28b. One or more of such grooves may be suitably employed. Again as in the embodiment of FIG. 3, pressurized fluid may or may not be introduced directly into one of these grooves.

FIG. 6 illustrates a further embodiment comprising in the bearing sleeve 28c a network of annular and longitudinal grooves 47 and 48, respectively, providing a waffle-like surface configuration which is suitable for relatively rapid response due to more immediate attainment of equilibrium of the fluid under pressure over the whole bearing surface.

The arrangement of FIG. 7 illustrates a groove 49 comprising a substantially helical configuration within sleeve 28d. One or more such helical, fluid distributing grooves may be formed in the bearing surface having the same or substantially parallel direction or a reverse direction.

The nature of the interference fit is further illustrated in FIG. 8 wherein the dimensions have been exaggerated to more clearly show detail. As seen therein sleeve bearing member 28e is constructed so as to have a dimension 51 in interfering engagement with the outer wall 52 of inner member 23 thereby effecting a mechanical interlock between the two surfaces.

Also illustrated in FIG. 8 is an alternate arrangement regarding the sealing feature, i.e., the tight seal adjacent the interlock is omitted. As shown, a bushing member 54 of conventional size and arrangement is positioned on either side of the interlock bearing segment and so arranged that pressurized fluid is introduced at a substantially greater rate than the fluid is permitted to flow out. The pressure build-up effects unlocking of the interface at 53 as follows: Pressurized fluid fed at 37 passes from interface 53 into adjacent space 50, where before passage to space 56, it is impeded by the more restricted space 57 which functions as an orifice and thereby builds up sufficient back pressure to unlock the bearing at 53.

The actuator 110 shown in FIG. 9 comprises an alternate embodiment wherein the bearing interlock surface is formed in the piston and fluid pressure to effect release is ported through "the piston" rather than through the cylinder or sleeve wall. As shown, a piston 112 and rod 113, to which the element to be actuated may be attached, is contained within a barrel or sleeve 111 in a bearing relationship therewith at 118. The barrel 111 is provided with a conventional fluid pressure extend port 121 and fluid pressure retract port 122 for piston 112. A seal 115, one or more of which may be used, contains the piston driving pressurized fluid within cylinder 111. The interlock bearing comprising an interference fit between the cylinder wall and piston 113 is shown at 118. Seals 119 and 120 in the piston substantially confine the pressurized fluid within the locking bearing area between these seals. Only a single seal 119 and 120 is illustrated on either side of the fluid pressure entry port, however, two or more may be utilized depending upon the level of pressure and the necessity of precluding even slight leakage.

In operation, the piston, in the absence of pressure introduced at 123 is in the locked state, i.e., bearing surface 118 of the piston is engaged or interlocked securely with the barrel surface. When fluid pressure is introduced at 123, a relative separation is effected between the locking surface 118 and barrel 111. At this stage, the piston can be moved by applying pressure through the extend port 121 into chamber 115 to act against the head of the piston 116 venting at port 122. For the reverse direction fluid may be introduced at 122 while venting at 121 so that pressure acting on 117 serves to move the piston.

A suitable valving system which may be used to coordinate the uncoupling or separation of the bearing lock and the movement of the piston, by hydraulic means, is described by reference to FIG. 10.

An external mechanical function can be utilized to move the piston P. However, this still requires that hydraulic pressure be applied to port 62 for releasing the interference fit prior to moving the actuator piston mechanically. When hydraulic pressure is also used to move the piston, pressure is introduced at 63 for the extend movement and at 64 for retraction.

Power for operating the hydraulic system (shown generally as 39 in FIG. 1) is provided by a power supply 38 which consists basically of a motor pump and reservoir. Directional valve 65 is used to extend or retract the actuator. Energizing solenoid A will extend the actuator, energizing solenoid B will retract it. In other embodiments the valve 65 could be manually or hydraulically operated. When valve 65 is actuated to either extend or retract, shuttle valve 66 ports pressure to the bearing-lock, thus permitting it to release. Flow control valve 67 controls the speed at which the actuator retracts and valve 68 controls the speed at which the actuator extends. These valves 67 and 68 would normally be pressure compensated to maintain full system pressure at the lock.

Figure 12:
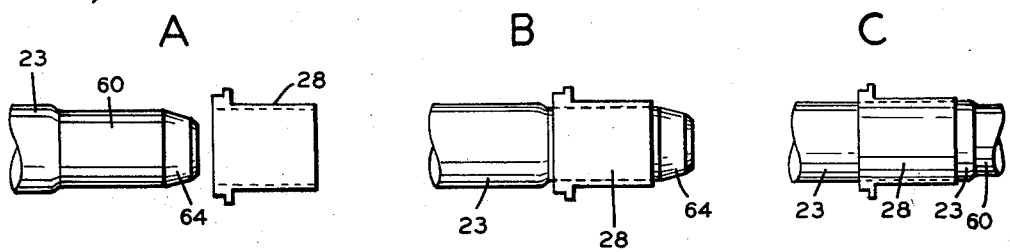
FIG. 12 is a schematic view showing the members of FIG. 8 in three stages of assembly.
Figure 14:
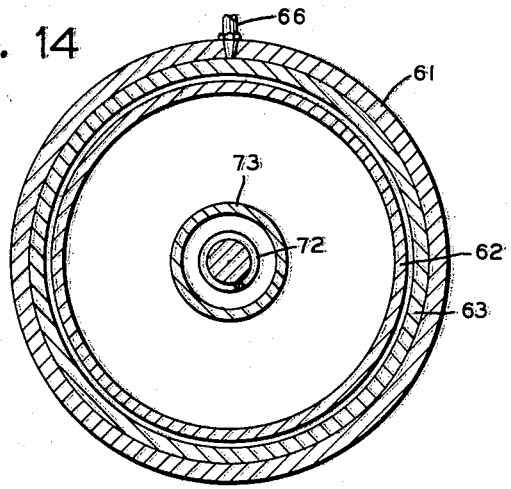
FIG. 14 is an end view of the actuator of FIG. 12 taken substantially along line 13—13.
Figure 16:
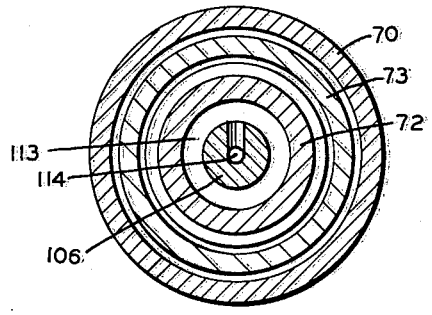
FIG. 16 is an end view of the actuator of FIG. 14 taken substantially along line 15—15.

Reference is now made to FIGS. 11 and 12 of the drawing concerning a procedure for assembling the bearing-lock actuator of the invention. While it has been the customary practice to assemble interference fit components by the use of heat and/or of cooling means for the members to expand one relative to the other and thereafter fitting the two together, this is normally an extremely cumbersome and time consuming operation. Disassembly is also very difficult. In accordance with one of the advantages of the invention, the pressurized fluid utilized in the operation of the mechanism is also employed to facilitate the assembly and disassembly of the interference fit members in lieu of prior art techniques of interfitting parts by use of temperature differential, i.e., by heating or chilling. As illustrated in FIGS. 11 and 12, an assembly rod or cylindrical element 60, referred to as a mandrel, may be formed so as to be removably attached to the inner bearing member or actuator arm 23. Alternately, mandrel 60 may be formed as an integral part of the rod 23. The mandrel 60 is provided with a reduced diameter extending for at least the length L which corresponds to the length of the interference fit segment of the outer sleeve or cylinder. Mandrel 60 is also preferably tapered at 61 to aid insertion into the cylindrical outer member. The length L of the mandrel should at least equal the length $L^1$ of the sleeve section 28 and is preferably at least slightly longer.

Assembly of the bearing-lock is as follows: The mandrel 60 provided with a minor but definite clearance is comparatively easily introduced into the sleeve portion 28 because of its reduced diameter relative to the bearing diameter. Where necessary a relatively minor force to overcome resistance of the seals 31 is used press fit 60 within bearing 28. In FIG. 12 three stages of assembly are illustrated: the separate components shown at A are assembled at B so that the mandrel portion 60 is fully contained within the sleeve 28 and L extends at least the full length of $L^1$. At this junction, seals 31 and 32 shown in FIG. 11 are in contact and become effective against the periphery of the mandrel 60. Fluid under pressure is now introduced at 37, effecting an expansion of the sleeve 28 within the elastic limit thereof and to an extent sufficient to permit the rod surface 23 to be pushed, using relatively moderate force, within the sleeve member 28, as shown in view C of FIG. 12. This means of assembly has been found to avoid the relatively cumbersome and time consuming technique which is involved in using the dimensional changes occurring from temperature differential. Also, only a minor proportion of the force which would otherwise be necessary to move members 23 with respect to 28 in the absence of pressure is needed.

Reference to FIG. 13 and FIG. 15 illustrates two alternate embodiments wherein the concept of the invention is used to overlapping interfitting or telescoping sections in cooperative relationship. This telescopic arrangement allows for relatively greater stroke for a given actuator length. In this capacity it affords very significant advantages in certain applications where limitations on space is a critical consideration. A telescopic unit of this character is capable of providing a stroke for the extended unit which is greater than the length of the closed unit itself.

Referring to FIG. 13 the mechanism comprises telescoping inner cylindrical piston or arm members 72 and 73. Members 72 and 73 are contained within the stepped portion 71 of barrel 70 so as to be capable of extending and collapsing in telescopic arrangement. A rod eye and end cap 74 is suitably attached to arm member 72. A base end cap 89 is suitably attached to rod 73. Telescoping sections 72 and 73 may be extended until end stroke stops 77 and 78 contact the limits elements 79 and 80 respectively formed on the inner periphery of the barrel 70. Inner arm member 72 is locked to the barrel 70 by an interference fit in a first bearing area 76. In a like manner arm 73 is locked by means of an interference fit to barrel 71 in a second bearing area 75.

Extension of the telescopic section is effected by introducing fluid under pressure into port 100 to unlock the interface of bearing 76 and into port 101 to unlock the interface of bearing 75. Dynamic seals 91 and 92 of a conventional commercial available configuration contain the pressurized fluid in bearing 76. Like seals 93 and 94 contain pressurized fluid in the bearing 75.

In the embodiment shown in FIG. 13, extension and retraction of the mechanism whose interference fit couplings have been unlocked by pressurization is accomplished by a rotating input shaft and screw arrangement. The shaft 84 is supported in conventional bearings 85 and any suitable driving means either manual or mechanized can be applied to rotate shaft 84. The screw 82 and torque tube 83 is of conventional configuration. Preferably screw 82 is of the high efficiency ball screw type of commercially available design. Translatory movement of the mechanism to effect extension and retraction of the telescopic sections is effected, after the bearings 75 and 76 are unlocked, by rotating tube 83 by a drive at 84 while holding the screw 82 stationary at the screw to cap attachment 87. Rotation in one direction extends the telescoping unit while a reverse drive of 84 effects retraction or withdrawal of the sections.

As described in this manner, extension and retraction is effected wholly through the screw 82. When so employed, the port 99 functions solely as a breather vent.

As an alternate arrangement, the extension of the mechanism may be accomplished by or aided by pressurization means of a conventional type such as hydraulic fluid. When so employed, port 99 would then be employed as a pressure inlet to permit the introduction of a pressurized fluid whose function would cooperate with the screw. Thus for example in the case of a heavy load, the majority of the required extending force may be supplied by, and optionally maintained by, the pressurized fluid introduced at 99 which in turn impinges on the surfaces 86 and 88 to extend, or aid in extending, the telescoped sections 70 and 72. The remaining force needed for positive movement being furnished by a drive at 84 acting through screw 82.

An alternate telescoping embodiment is shown by reference to the arrangement of FIG. 15. In this figure, like numerals refer to similar parts present and described in FIG. 13. In FIG. 15 the extension and retraction of the telescoping sections are obtained solely by applying pressurized fluid to the port 104 which in turn impinges on surfaces 107 and 108 to extend the telescoped sections. To retract the respective members, pressurized fluid is introduced to the ports 105 and 114. This pressure impinges upon surfaces 112 and 113.

Fluid introduced at 104 is contained by seals 109 and 110. Fluid introduced at 105 is contained by seals 93 and 109. Fluid introduced at 114 is contained by seals 110 and 111.

Thus, in the collapsed position of the mechanism, as the bearings are unlocked by fluid pressure introduced at 100 and 101 by controlled valving, pressurized fluid is thereafter introduced at 104 to move the mechanism. In so doing pressure is applied against the extend surfaces 107 and 108. This has the effect of extending the actuator for all or any distance of the permissible extension. For the reverse movement fluid is introduced at 105 and 114 while the controlled valving permitting fluid to vent from port 104.

While arrangements comprising only three relatively movable telescoping sections are described in detail herein, it will be apparent that the invention contemplates also a structure having 4, 5, 6 or more telescoping sections. FIG. 13 is distinguished generally from FIG. 15 in that the former is moved by mechanical means, i.e., the screw, while the embodiment of FIG. 13 is illustrative of an embodiment of an actuator movable by fluid means.

It will be apparent that various other mechanical means may be utilized to move the telescoping components, such as, rack and pinion, standard screw rather than ball screw, drive, chain and/or cable and pulley means, and the like. However, such means still require that fluid pressure, preferably hydraulic, be applied to the bearing lock interface to release the interference fit prior to moving the actuator piston mechanically.

From the foregoing description taken in conjunction with the accompanying drawings, it will be apparent that this invention provides a novel arrangement in the art of actuators which are superior in force capabilities and dependability. Various modifications may be made in the invention without departing from the contribution taught by the invention.

What is claimed is:

1. An actuator which includes two elements arranged to function in bearing relationship comprising as the first element an outer cylindrical sleeve and as the second element an inner bearing member forming an interference fit at the interface between said elements, means for resisting flow of the fluid under pressure disposed at each side of said interface, a port for delivering pressurized fluid to the interface between said sleeve and inner bearing member, means for introducing fluid under pressure to said interface through said port to effect a relative separation and unlocking of said sleeve from said inner bearing member and means for actuating the sleeve relative to the inner bearing member means when said interlocking segment is unlocked by pressurization.

2. In an actuator for transmitting axial forces including a rigid cylinder, an inner member in said cylinder and means for driving said inner member with respect to said cylinder, the improvement comprising forming an interlocking annular segment at the interface of said inner member and said cylinder by providing at least part of the outer diameter of said inner member with a diameter greater than a coinciding part of the inner diameter of said cylinder, said segment forming a lock and bearing for the cylinder and inner member, a port for delivering pressurized fluid at the interface in said segment between said cylinder and the piston member, means for introducing fluid under pressure to said interface through said port to effect a relative separation and unlocking from said inner member of the interlocked annular segment of said cylinder and means for actuating the inner member when said interlocking segment is unlocked by fluid pressure applied at said interface.

3. In an actuator for transmitting axial forces including a rigid cylinder, a piston member in said cylinder and means for axially driving said piston with respect to said cylinder, the improvement comprising forming an interlocking annular segment at the interface of said piston member and said cylinder wherein at least part of the outer diameter of said piston is greater than the inner diameter of said segment, fluid tight peripheral seals disposed at each side of said interlocking segment, a port for delivering pressurized fluid at said interface between said seals, means for introducing fluid under pressure to said interface through said port to effect a relative separation and unlocking from said piston of the interlocked annular segment of said cylinder, and means for actuating the piston driving means when said interlocking segment is unlocked by pressurization.

4. The actuator of claim 2 wherein the interlocking annular bearing segment comprises an annular portion of reduced diameter in said cylinder.

5. The actuator of claim 2 wherein the interlocking annular bearing segment comprises an annular portion of increased diameter in said piston member.

6. The arrangement of claim 2 wherein said annular segment contains a groove extending substantially axially and in communication with said port.

7. The actuator of claim 2 wherein said annular segment is provided at said interface with a plurality of axially disposed grooves.

8. The actuator of claim 2 wherein said annular segment is provided at said interface with a plurality of annular grooves.

9. The actuator of claim 2 wherein said annular segment is provided at said interface with a waffle-like network comprising a plurality of annular and axial grooves.

10. A telescoping actuator mechanism for transmitting axial forces comprising in combination, an outer cylindrical member, an intermediate cylindrical member within said outer member, and a third member of circular cross-section concentrically disposed at least in part within said intermediate member, said intermediate and third members characterized by having at least a segment of said outer periphery, which is disposed in concentric relationship with its respective outer cylindrical members, in an interference fit interlocking relationship with said respective outer cylindrical member, fluid tight peripheral seals disposed at each side of said interlocking segments, a port for delivering pressurized fluid at said interfaces of the interference fit of said segments between said seals, means for introducing fluid under pressure to the interface of said segments through said port to effect a relative separation and unlocking of the interlocked annular segments of said cylinders and means for moving each of the intertelescoping members relative to each other, when said interlocking part is unlocked by pressurization at the interface of said sgments.

11. The mechanism of claim 10 wherein said means for relative movement of the telescoping members comprises mechanical means.

12. The mechanism of claim 10 wherein said means for moving the telescoping members comprises a fluid drive means.

13. The mechanism of claim 12 wherein said fluid drive means is employed in conjunction with a mechanical drive means.

References Cited in the file of this patent

UNITED STATES PATENTS

| | | |
|---|---|---|
| 961,375 | Seabrook | June 14, 1910 |
| 2,764,437 | Bratt | Sept. 25, 1956 |
| 2,817,142 | Boden et al. | Dec. 24, 1957 |
| 2,946,610 | Jenness | July 26, 1960 |
| 2,980,474 | Gargan | Apr. 18, 1961 |
| 2,988,387 | Eschmann et al. | June 13, 1961 |
| 2,992,479 | Musser et al. | July 18, 1961 |
| 3,058,559 | Ohrnberger | Oct. 16, 1962 |
| 3,108,839 | Johnson | Oct. 29, 1963 |